(12) United States Patent
Sivakumar et al.

(10) Patent No.: US 6,365,052 B1
(45) Date of Patent: Apr. 2, 2002

(54) VERY HIGH MOLECULAR WEIGHT CATIONIC DISPERSION POLYMERS FOR DEWATERING ANIMAL FARM WASTEWATER

(75) Inventors: Ananthasubramanian Sivakumar, Aurora; Cathy C. Johnson, Geneva, both of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/532,119

(22) Filed: Mar. 21, 2000

(51) Int. Cl.$^7$ .................................................. C02F 1/56
(52) U.S. Cl. ...................... 210/728; 210/732; 210/734; 524/922
(58) Field of Search ................................ 210/705, 725, 210/727, 728, 734, 735, 732, 905; 524/922

(56) References Cited

U.S. PATENT DOCUMENTS

| | | | |
|---|---|---|---|
| 4,929,655 A | | 5/1990 | Takeda et al. ............... 524/458 |
| 5,006,590 A | | 4/1991 | Takeda et al. ............... 524/458 |
| 5,531,907 A | | 7/1996 | Williams et al. ............. 210/727 |
| 5,597,858 A | | 1/1997 | Ramesh et al. ............... 524/458 |
| 5,614,602 A | | 3/1997 | Connors et al. ........... 526/307.3 |
| 5,733,462 A | * | 3/1998 | Mallon et al. ............... 210/728 |
| 5,750,034 A | | 5/1998 | Wong Shing et al. ....... 210/705 |
| 5,776,350 A | * | 7/1998 | Miknevich et al. .......... 210/710 |
| 6,171,505 B1 | * | 1/2001 | Maury et al. ............... 210/727 |

FOREIGN PATENT DOCUMENTS

| | | |
|---|---|---|
| CA | 2125545 AA | 12/1994 |
| EP | 183 466 B1 | 8/1990 |
| EP | 364 175 B1 | 12/1994 |
| EP | 657 478 A2 | 6/1995 |

* cited by examiner

*Primary Examiner*—Peter A. Hruskoci
(74) *Attorney, Agent, or Firm*—Bell, Boyd & Lloyd LLC

(57) ABSTRACT

This invention is directed to a method of dewatering animal farm waste water comprising:

(1) adding an effective amount of a cationic dispersion polymer having an RSV of at least 24, the dispersion polymer prepared by polymerizing under free radical forming conditions in an aqueous solution of a water-soluble salt in the presence of one or more particle stabilizing polymers
   (i) from about 20 to about 90 mole percent nonionic monomers and
   (ii) from about 10 to about 80 mole percent of cationic monomers wherein the cationic monomers are selected from at least one hydrophilic cationic monomer and at least one hydrophobic cationic monomer and wherein less than 50 percent of the cationic monomers on a molar basis are hydrophobic monomers, (2) mixing the waste water and the cationic dispersion polymer to form a mixture of water and flocculated solids and (3) separating the flocculated solids from the water.

9 Claims, No Drawings

VERY HIGH MOLECULAR WEIGHT CATIONIC DISPERSION POLYMERS FOR DEWATERING ANIMAL FARM WASTEWATER

TECHNICAL FIELD

This invention is directed to a method of dewatering animal farm wastewater using very high molecular weight cationic dispersion polymers.

BACKGROUND OF THE INVENTION

The agricultural community, and animal farms in particular, faces never-ending concerns regarding the disposal and spreading of agricultural waste onto land. As new environmental legislation is enforced, the agricultural community is finding itself under increased scrutiny. Among other matters, the agricultural community is concerned with the very high pollution potential of farm slurries.

In addition to the lowering of pollution, the agricultural community strives to reduce slurry volume. The reduction of slurry volume provides environmental advantages. For instance, the reduction of slurry volume can alleviate the need for large holding tanks. Moreover, since a reduced slurry volume lessens the number of times heavy machinery passes over the land, spreading is less time consuming and less arduous on the land. Still further, the reduction of slurry volume reduces the possibility of runoff onto local watercourses.

Although many methods have been proposed for the treatment of agricultural waste such as odor control of slurries, use of high pressure filtration systems for removal of suspended solids from the slurry, aerobic & anaerobic digestion etc., none of the proposed methods are being implemented on any significant scale.

Therefore, the current options for waste treatment are limited. At present, farm waste is generally recycled via lagoon collection and intermittent slurry application onto land. However, as a result of the new Environmental Protection Act (1991), the National Rivers Authority Proposals for Protection of Groundwater, and the new Control of Pollution Regulations (1991), restrictions are now being placed upon how waste is collected and reused. Conceivably, regulations will be enacted that control the use of such agricultural waste. For instance, regulations will likely place a ban on the application of waste to certain top grade agricultural lands.

If such regulations are enacted, the agricultural waste will have to be disposed of off-site resulting in substantial expense resulting from shipment of slurry to off-site disposal sites.

Therefore, a need exists for a treatment system that addresses all the environmental concerns presented by animal farm waste, while at the same time not involving high capital costs.

A method for purifying agricultural waste comprising treating the waste with a latex or dispersion polymer flocculant, an organic coagulant alone or in combination with an inorganic coagulant and one or more precipitants is disclosed in U.S. Pat. No. 5,531,907. However, there is an ongoing need to improve the efficiency and effectiveness of flocculants for dewatering animal farm waste water.

SUMMARY OF THE INVENTION

We have discovered that very high molecular weight cationic dispersion polymers that incorporate specific amounts of hydrophobic cationic monomers are far more efficient at dewatering animal farm wastewater than the cationic dispersion polymers disclosed to date.

Accordingly, in its principle aspect, this invention is directed to a method of dewatering animal farm waste water comprising:

(1) adding an effective amount of a cationic dispersion polymer having an RSV of at least 24 dl/g, the dispersion polymer prepared by polymerizing under free radical forming conditions in an aqueous solution of a water-soluble salt in the presence of a particle stabilizing agent
   (i) from about 20 to about 90 mole percent nonionic monomers and
   (ii) from about 10 to about 80 mole percent of cationic monomers wherein the cationic monomers are selected from at least one hydrophilic cationic monomer and at least one hydrophobic cationic monomer and wherein less than 50 percent of the cationic monomers on a molar basis are hydrophobic monomers, (2) mixing the waste water and the cationic dispersion polymer to form a mixture of water and flocculated solids and (3) separating the flocculated solids from the water.

The very high molecular weight cationic dispersion polymers of this invention are superior to previously disclosed cationic dispersion polymers for dewatering animal farm wastewater in a number of aspects. For instance, higher molecular weight improves polymer performance by the more effective bridging of suspended particle contaminants in the wastewater, thus forming larger flocs.

Furthermore, it is known in the art that inclusion of a hydrophobic monomer component facilitates the smooth precipitation of fine dispersion particles during a polymerization and reduction of the level of hydrophobic monomer increases the difficulty of preparing stable dispersion polymers. We demonstrate herein that it is feasible to simultaneously prepare very high molecular weight cationic dispersion polymers while reducing the hydrophobic monomer component of the polymer to less than 50 percent of the total cationic monomer content.

The combination of very high molecular weight and reduced hydrophobic monomer content in the cationic dispersion polymers of this invention results in flocs having enhanced strength and stability. Strong and large flocs are critical to high performance in dewatering applications where higher levels of mechanical system shear are experienced.

DETAILED DESCRIPTION OF THE INVENTION

As used herein, the following terms shall have the following meanings.

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkoxy" and "alkoxyl" mean an alkyl—O— group wherein alkyl is defined herein. Representative alkoxy groups include methoxyl, ethoxyl, propoxyl, butoxyl, and the like.

"Alkylene" means a divalent group derived from a straight or branched chain saturated hydrocarbon by the removal of two hydrogen atoms. Representative alkylene groups include methylene, ethylene, propylene, and the like.

"Hydroxypropylene" means a propylene group substituted with hydroxy.

"Aryl" means an aromatic monocyclic or multicyclic ring system of about 6 to about 20 carbon atoms, preferably of about 6 to about 10 carbon atoms. The aryl is optionally substituted with one or more alkyl, alkoxy, halogen or haloalkyl groups. Representative aryl groups include phenyl or naphthyl, or substituted phenyl or substituted naphthyl. A preferred substituent is alkyl.

"Arylalkyl" means an aryl-alkylene-group wherein aryl and alkylene are defined herein. Representative arylalkyl include benzyl, phenylethyl, phenylpropyl, 1-naphthylmethyl, and the like. A preferred arylalkyl is benzyl.

"Halogen" means fluorine, chlorine, bromine or iodine.

"Haloalkyl" means an alkyl group, as defined herein, having one, two, or three halogen atoms attached thereto. Representative haloalkyl groups include chloromethyl, bromoethyl, trifluoromethyl, and the like.

"Anionic counterion" means any organic or inorganic anion which neutralizes the positive charge on the quaternary nitrogen atom of a cationic monomer as defined herein. Representative anionic counterions include halogen, sulfate, phosphate, monohydrogen phosphate, nitrate, and the like. A preferred anionic counterion is halogen.

"Monomer" means a polymerizable allylic, vinylic or acrylic compound. The monomer may be anionic, cationic or nonionic. Vinyl monomers are preferred, acrylic monomers are more preferred.

"Nonionic monomer" means a monomer as defined herein which is electrically neutral. Representative nonionic monomers include acrylamide (AcAm), methacrylamide, N-methylacrylamide, N,N-dimethyl(meth)acrylamide, N-isopropyl(meth)acrylamide, N-(2-hydroxypropyl) methacrylamide, N-methylolacrylamide, N-vinylformamide, N-vinylacetamide, N-vinyl-N-methylacetamide, poly(ethylene glycol)(meth)acrylate, poly (ethylene glycol) monomethyl ether mono(meth)acryate, N-vinyl-2-pyrrolidone, glycerol mono((meth)acrylate), 2-hydroxyethyl(meth)acrylate, vinyl methylsulfone, vinyl acetate, and the like. Preferred nonionic monomers include acrylamide and methacrylamide. Acrylamide is more preferred.

"Hydrophilic cationic monomer" means a monomer as defined herein which possesses a net positive charge and is relatively hydrophilic in nature. Hydrophilic cationic monomers have formula

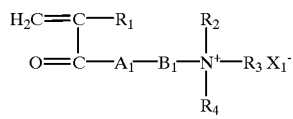

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alkyl; $R_3$ is H or $C_1$–$C_2$ alkyl; and $X_1$ is an anionic counterion. Representative hydrophilic cationic monomers include dimethylaminoethylacrylate methyl chloride salt (DMAEA•MCQ), dimethylaminoethylmethacrylate methyl chloride salt (DMAEM•MCQ), dimethylaminoethyl-methacrylate methyl sulfate salt (DMAEM•MSQ), dimethylaminoethylacrylate methyl sulfate salt (DMAEA•MSQ), methacrylamidopropyl trimethylammonium chloride (MAPTAC), acrylamidopropyl trimethylammonium chloride (APTAC), and the like. Dimethylaminoethylacrylate methyl chloride salt is preferred.

"Hydrophobic cationic monomer" means a monomer as defined herein which possesses a net positive charge and is relatively hydrophobic in nature. Hydrophobic cationic monomers have formula

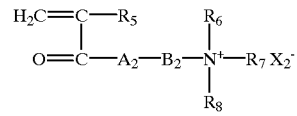

wherein $A_2$ is O or NH; $B_2$ is $C_2$–$C_4$ alkylene or hydroxypropylene; $R_5$ is H or $CH_3$; $R_6$ and $R_8$ are $C_1$–$C_2$ alkyl; $R_7$ is $C_6$–$C_{20}$ alkyl or arylalkyl; and $X_2$ is an anionic counterion. Representative hydrophobic cationic monomers include dimethylaminoethylmethacrylate benzyl chloride salt (DMAEM•BCQ), dimethylaminoethylacrylate benzyl chloride salt (DMAEA•BCQ), dimethylaminoethylacrylate cetyl chloride salt, and the like. Dimethylaminoethylacrylate benzyl chloride salt is preferred.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_0}\right) - 1\right]}{c}$$

wherein η=viscosity of polymer solution;

$\eta_o$=viscosity of solvent at the same temperature; and c=concentration of polymer in solution.

As used herein, the units of concentration "c" are (grams/100 ml or g/deciliter). Therefore, the units of RSV are dl/g. The RSV is measured at 30° C. The viscosities η and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. For the RSV measurements reported herein, the polymer concentration used is 0.045% polymer actives dissolved in a 0.125N ammonium nitrate solution.

Similar RSVs measured for two linear polymers of identical or very similar composition is one indication that the polymers have similar molecular weights, provided that the polymer samples are treated identically and that the RSVs are measured under identical conditions.

"Intrinsic viscosity" (IV) means RSV in the limit of infinite polymer dilution (i.e. the intercept where polymer concentration is extrapolated to zero). The IV, as used herein, is obtained from the y-intercept of the plot of RSV versus polymer concentration in the range of from about 0.015 to about 0.045 weight percent polymer.

"Effectiveness" means the maximum water drainage in 10 seconds from a polymer-treated sludge, as measured using the free drainage test described herein.

"Efficiency" means the amount of polymer required, in comparison to the amount of a control polymer, to obtain a given drainage.

"Replacement ratio" is a quantitative measure of relative polymer efficiency at a given drainage with respect to a control polymer. As used herein, the replacement ratio ("RR") for two polymers I and II for a given drainage (usually the optimum drainage) is defined as follows:

$$RR = \frac{\text{dose of polymer I}}{\text{dose of polymer II}}$$

where polymer II is the control polymer and drainage volume is measured using the free drainage test described herein.

"Dispersion polymer" means a fine dispersion of a water-soluble polymer in an aqueous continuous phase containing one or more inorganic salts and one or more particle stabilizing polymers. Representative examples of dispersion polymerization of water-soluble polymers in an aqueous continuous phase are found in U.S. Pat. Nos. 4,929,655; 5,006,590; 5,597,859; 5,597,858; and European patent Nos. 630,909 and 657,478.

Particle stabilizing polymers, also referred to as stabilizers or dispersants, facilitate the formation of fine particles and keep the formed polymer particles from becoming agglomerated and forming a gel rather than a fine dispersion of particles. Suitable particle stabilizing polymers include water-soluble cationic polymers that are soluble in the initial reaction mixture. Representative particle stabilizing polymers include homopolymers of cationic diallyl-N,N-disubstituted ammonium monomers or N,N-disubstituted-aminoethyl(meth)acrylate monomers and their quaternary salts, copolymers of diallyl-N,N-disubstituted ammonium monomers and N,N-disubstituted-aminoethyl(meth)acrylate monomers and their quaternary salts and cationic polymers comprising 20 mole percent or more of cationic diallyl-N,N-disubstituted ammonium monomers or N,N-disubstituted-aminoethyl(meth)acrylate monomers and their quaternary salts and one or more nonionic monomers, preferably acrylamide, methacrylamide or styrene. The molecular weight of the stabilizer is preferably in the range of about 10,000 to 10,000,000. Preferred particle stabilizing polymers include homopolymers of diallyldimethyl ammonium chloride, dimethylaminoethylacrylate methyl chloride quaternary salt and dimethylaminoethylmethacrylate methyl chloride quaternary salt. The particle stabilizing polymer(s) are used in an amount of from about 1 to about 10% by weight based on the total weight of the dispersion polymer.

Polyvalent anionic salts suitable for preparing the dispersion polymer include inorganic or organic sulfates, phosphates, chlorides or a mixture thereof. Preferred salts anionic salts include ammonium sulfate, sodium sulfate, magnesium sulfate, aluminum sulfate, ammonium hydrogen phosphate, sodium hydrogen phosphate, potassium hydrogen phosphate and ammonium chloride. The salts are used in aqueous solution typically having a combined total concentration of 15 weight percent or above in the product mixture.

The cationic dispersion polymer of this invention is prepared by preparing a mixture of water, one or more polyvalent anionic salts, nonionic monomers, hydrophilic cationic monomers, hydrophobic cationic monomers, one or more particle stabilizing polymers, any polymerization additives such as chelants, pH buffers or chain transfer agents and charging the mixture to a reactor equipped with a mixer, a temperature regulating thermocouple, a nitrogen purging tube, and a water condenser.

A batch or semi-batch polymerization method can be employed to prepare the dispersion polymer of this invention. In a batch polymerization, the polymeric stabilizers, chain transfer agents, monomers, chelant, and water are initially added to the reactor. All or a portion of the formulation salt/salts are also added to the reactor at this time. Mechanical agitation is started and the reactor contents are heated to the desired polymerization temperature. When the set-point temperature is reached, the initiator is added and a nitrogen purge is started. The reaction is allowed to proceed at the desired temperature until completion and then the contents of the reactor are cooled. Additional inorganic salts may be added during the polymerization to maintain processability or influence final product quality. Moreover, additional initiator may be added during the reaction to achieve desired conversion rates and facilitate reaction completeness. Post polymerization additives such as additional salt, water, stabilizers for molecular weight and pH and anti-foaming and biocidal agents may also be added to the reaction mixture.

Use of a semi-batch polymerization method will vary from a batch polymerization method only in that one or more of the monomers used in the synthesis of the polymer are held out in part or whole at the beginning of the reaction. The withheld monomer is then added over the course of the polymerization. If acrylamide monomer is used as a semi-batch monomer, a chelant is often also added during the semi-batch period.

A multifunctional alcohol such as glycerin or polyethylene glycol may also be included in the polymerization system. The deposition of the fine particles is smoothly carried out in the presence of these alcohols. A chain transfer agent such as sodium formate may also be added to control precipitation and polymer molecular weight.

The polymerization reaction is initiated by any means that results in generation of a suitable free-radical. Thermally derived radicals, in which the radical species results from thermal, homolytic dissociation of a water-soluble azo, peroxide, hydroperoxide and perester compound are preferred. Especially preferred initiators are azo compounds including 2,2'-azobis[2-(2-imidazolin-2-yl)propane] dihydrochloride and 2,2'-azobis(2-methylpropionamide) dihydrochloride.

A seed polymer may be added to the reaction mixture before the initiating polymerization of the monomers for the purpose of obtaining a fine dispersion. The seed polymer is a water-soluble cationic polymer that is insoluble or has reduced solubility in the aqueous solution of the polyvalent anion salt. The monomer composition of the seed polymer need not be identical to that of the water-soluble cationic polymer formed during polymerization. The seed polymer is preferably a polymer prepared from the above monomer mixture by the process described herein.

Since the dispersion polymers do not contain surfactants or oil, the dispersion polymers are environmentally friendly. Moreover, the absence of oil in the dispersion polymers equates to such polymers having virtually zero volatile organic content (VOC), which is another environmental advantage of such polymers.

The cationic dispersion polymers described herein confer additional advantages to the dewatering process. Specifically, the cationic dispersion polymers are used without the unwanted addition of oils and surfactants as compared to conventional cationic latex polymers, imparting both processing and environmental benefits. Additionally, these cationic dispersion polymers require no inverter system and can be introduced to the dewatering process using simple feeding equipment resulting in savings in manpower and water resources.

The cationic dispersion polymers of this invention also offer advantages over dry powder polymer products. In most cases, conventional water-soluble polymers are now commercially available in a powder form. Dry powered products present environmental hazards due to dusting and inhalation problems associated with the particulate nature of the products. Additionally, prior to use, the polymeric powder must be dissolved in an aqueous medium for actual application. The polymer swells in aqueous medium, and the dispersed particles flocculate. It is typically very difficult to dissolve the conventional polymers in an aqueous medium. By contrast, the cationic dispersion polymers of this invention, by their nature, avoid dissolution-related problems.

The cationic dispersion polymers of this invention also offer advantages over solution polymer products. In general, solution polymerization is used to prepare lower molecular weight polymers, as the solution tends to become too viscous as the polymer molecular weight increases. Polymer actives concentrations are also significantly restricted by the resulting high product viscosity in solution polymer products. Use of dispersion polymerization techniques as described herein allow for the preparation of free-flowing high molecular weight, high polymer actives polymer compositions whereas the corresponding solution polymer would otherwise be too viscous for use without prior dilution.

The cationic dispersion polymer of this invention may be used as a sole treatment agent for dewatering animal farm wastewater or in combination with one or more coagulants and one or more precipitants in a method of purifying agricultural waste as described in U.S. Pat. No. 5,531,907, incorporated herein by reference.

The cationic dispersion polymer is added to the animal farm waste in an amount of from about 50 ppm to about 500 ppm, preferably from about 100 ppm to about 200 ppm based on polymer actives. The cationic dispersion polymer is injected into the agricultural waste with or without a dilution system.

In a preferred aspect of this invention, the cationic dispersion polymer is prepared by polymerizing under free radical forming conditions in an aqueous solution of a water-soluble salt in the presence of a one or more particle stabilizing polymers
  (i) from about 40 to about 80 mole percent nonionic monomers and
  (ii) from about 20 to about 60 mole percent of cationic monomers wherein the cationic monomers are selected from at least one hydrophilic cationic monomer and at least one hydrophobic cationic monomer.

In another preferred aspect, the cationic dispersion polymer is prepared by polymerizing under free radical forming conditions in an aqueous solution of a water-soluble salt in the presence of one or more particle stabilizing polymers
  (i) from about 50 to about 70 mole percent nonionic monomers and
  (ii) from about 30 to about 50 mole percent of cationic monomers wherein the cationic monomers are selected from at least one hydrophilic cationic monomer and at least one hydrophobic cationic monomer.

In another preferred aspect, the cationic dispersion polymer is a terpolymer prepared by polymerizing under free radical forming conditions in an aqueous solution of a water-soluble salt in the presence of one or more particle stabilizing polymers
  (i) from about 50 to about 70 mole percent nonionic monomer and
  (ii) from about 30 to about 50 mole percent of cationic monomers wherein the cationic monomers are selected from a hydrophilic cationic monomer and a hydrophobic cationic monomer.

In a more preferred aspect, the nonionic monomer is acrylamide, the hydrophilic cationic monomer is dimethylaminoethylacrylate methyl chloride salt and the hydrophobic cationic monomer is dimethylaminoethylacrylate benzyl chloride salt.

In another more preferred aspect, the cationic dispersion polymer is a 65/20/15 mole percent acrylamide/dimethylaminoethylacrylate methyl chloride salt/dimethylaminoethylacrylate benzyl chloride salt terpolymer.

In another more prefered aspect, the cationic dispersion polymer is added to the animal farm waste in an amount of from about 50 ppm to about 500 ppm based on polymer actives.

In another more preferred aspect, the cationic dispersion polymer is added to the animal farm waste in an amount of from about 100 ppm to about 200 ppm based on polymer actives.

In another more preferred aspect, the animal farm wastewater is selected from dairy wastewater and hog farm wastewater.

The foregoing may be better understood by reference to the following, which is presented for purposes of illustration and is not intended to limit the scope of this invention.

The RSV and IV's of representative commercially available cationic dispersion polymers and representative polymers of this invention are compared in Table 1. In Table 1, Polymers A and B are 65/10/25 mole percent AcAm/DMAEA•MCQ/DMAEA•BCQ dispersion polymers, available from Nalco Chemical Company, Naperville, Ill., representative of the best performing polymer disclosed in U.S. Pat. No. 5,531,907. Polymers C and D are 65/20/15 mole percent AcAm/DMAEA•MCQ/DMAEA•BCQ, representative of the cationic dispersion polymers of this invention.

TABLE 1

| RSV and IV of Representative Cationic Dispersion Polymers | | |
| --- | --- | --- |
| Polymer | RSV dl/g | IV dl/g |
| A | 11.1 | 9.2 |
| B | 17.2 | 13.4 |
| C | 26.7 | 19.6 |
| D | 24.8 | 19.4 |

A Free Drainage Test is used to evaluate the polymer performance in sludge dewatering. To 200 ml of the sludge in a 500-ml cylinder, the polymer at the desired concentration is added. The mixing of the sludge and the polymer solution is achieved by inverting the cylinder a consistent number of times. The flocculated sludge is then poured through a belt filter press cloth and the amount of water drained is measured as a function of time. The amount of water drained in 10 seconds is taken as a measure of the polymer performance.

Filtrate and cake quality is rated visually on a scale of 0–4, with 4 being the best. Clarity is desired in the filtrate and a dry compact cake is desired from the dewatered solids.

Animal farm wastewater essentially consists of the animal shed washings (including the animal urine and feces), farmyard scrapings and other runoff water. In the case of the dairy farm, it also contains waste milk. The wastewater is collected in a lagoon and then either used as fertilizer in fields or further stored in storage tanks. The wastewater used herein is obtained prior to the lagoon. Hog wastewater is obtained from a Wisconsin hog farm. Dairy wastewater is obtained from an Illinois dairy farm.

The performance of the polymer of this invention in dewatering animal farm waste is shown in Tables 2 and 3. In Tables 2 and 3, Polymer C is a 65/20/15 mole percent AcAm/DMAEA•MCQ/DMAEA•BCQ dispersion polymer having about 20 percent polymer actives and an RSV of about 27 dl/g, representative of the cationic dispersion polymers of this invention. Polymer B is a commercially available 65/10/25 mole percent AcAm/DMAEA•MCQ/DMAEA•BCQ dispersion polymer having about 20 percent polymer actives and an RSV of about 17 dl/g, available from Nalco Chemical Company, Naperville, Ill., representative of the best performing polymer disclosed in U.S. Pat. No. 5,531,907.

TABLE 2

Dewatering of Hog Farm Waste Water

| Product (1% solution) | Dose, ml | Drainage, ml | Cake | Filtrate |
|---|---|---|---|---|
| C | 8 | 128 | 2 | 2 |
| C | 9 | 134 | 2 | 3 |
| C | 10 | 116 | 2 | 2 |
| B | 12 | 94 | 1 | 2 |
| B | 13 | 112 | 1 | 2 |
| B | 14 | 130 | 2 | 2 |
| B | 15 | 128 | 2 | 3 |

TABLE 3

Dewatering of Dairy Farm Waste Water

| Product (1% solution) | Dose, ml | Drainage, ml | Cake | Filtrate |
|---|---|---|---|---|
| C | 28 | 110 | 2 | 0.5 |
| C | 30 | 112 | 2 | 1 |
| C | 32 | 114 | 2 | 1 |
| C | 35 | 120 | 2 | 2 |
| B | 35 | 44 | 0 | 0 |
| B | 45 | 70 | 1 | 0.5 |
| B | 55 | 110 | 2 | 1.5 |
| B | 60 | 130 | 2 | 1.5 |

As shown in Tables 2 and 3 for two different animal farm wastewaters, Polymer C outperforms Polymer B. Polymer C is as effective as Polymer B in the amount of water drained. However, Polymer C is much more efficient than Polymer B as is evident from the lower dose required to achieve the same drainage (replacement ratio of about 0.6 for hog farm wastewater and about 0.5 for dairy farm wastewater), thus significantly reducing the required dosage of polymer necessary to achieve comparable efficiency to that of polymers currently existing in the marketplace.

Furthermore, the flocs produced by Polymer C were larger and did not break down as easily as those produced by Polymer B. This higher shear resistance of the flocs provides superior performance in high shear dewatering applications.

What is claimed is:

1. A method of dewatering animal farm waste water comprising:
   (1) adding an effective amount of a cationic dispersion polymer having an RSV of at least 24 dl/g, the dispersion polymer prepared by polymerizing under free radical forming conditions in an aqueous solution of a water-soluble salt in the presence of one or more particle stabilizing polymers
      (i) from about 20 to about 90 mole percent nonionic monomers and
      (ii) from about 10 to about 80 mole percent of cationic monomers wherein the cationic monomers are selected from at least one hydrophilic cationic monomer and at least one hydrophobic cationic monomer and wherein less than 50 percent of the cationic monomers on a molar basis are hydrophobic monomers,
   (2) mixing the waste water and the cationic dispersion polymer to form a mixture of water and flocculated solids and
   (3) separating the flocculated solids from the water.

2. The method of claim 1 wherein the cationic dispersion polymer is prepared by polymerizing under free radical forming conditions in an aqueous solution of a water-soluble salt in the presence of a one or more particle stabilizing polymers
   (i) from about 40 to about 80 mole percent nonionic monomers and
   (ii) from about 20 to about 60 mole percent of cationic monomers wherein the cationic monomers are selected from at least one hydrophilic cationic monomer and at least one hydrophobic cationic monomer.

3. The method of claim 1 wherein the cationic dispersion polymer is prepared by polymerizing under free radical forming conditions in an aqueous solution of a water-soluble salt in the presence of one or more particle stabilizing polymers
   (i) from about 50 to about 70 mole percent nonionic monomers and
   (ii) from about 30 to about 50 mole percent of cationic monomers wherein the cationic monomers are selected from at least one hydrophilic cationic monomer and at least one hydrophobic cationic monomer.

4. The method of claim 1 wherein the cationic dispersion polymer is a terpolymer prepared by polymerizing under free radical forming conditions in an aqueous solution of a water-soluble salt in the presence of one or more particle stabilizing polymers
   (i) from about 50 to about 70 mole percent nonionic monomer and
   (ii) from about 30 to about 50 mole percent of cationic monomers wherein the cationic monomers are selected from a hydrophilic cationic monomer and a hydrophobic cationic monomer.

5. The method of claim 4 wherein the nonionic monomer is acrylamide, the hydrophilic cationic monomer is dimethylaminoethylacrylate methyl chloride salt and the hydrophobic cationic monomer is dimethylaminoethylacrylate benzyl chloride salt.

6. The method of claim 1 wherein the cationic dispersion polymer is a 65/20/15 mole percent acrylamide/dimethylaminoethylacrylate methyl chloride salt/dimethylaminoethylacrylate benzyl chloride salt terpolymer.

7. The method of claim 1 wherein the cationic dispersion polymer is added to the animal farm waste in an amount of from about 50 ppm to about 500 ppm based on polymer actives.

8. The method of claim 1 wherein the cationic dispersion polymer is added to the animal farm waste in an amount of from about 100 ppm to about 200 ppm based on polymer actives.

9. The method of claim 1 wherein the animal farm wastewater is selected from dairy wastewater and hog farm wastewater.

* * * * *